US009083074B2

(12) United States Patent
Ayatollahi et al.

(10) Patent No.: US 9,083,074 B2
(45) Date of Patent: Jul. 14, 2015

(54) DYNAMIC ANTENNA SELECTION BASED ON USER HAND POSITION

(75) Inventors: Mina Ayatollahi, Waterloo (CA); Qinjiang Rao, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 252 days.

(21) Appl. No.: 13/442,452

(22) Filed: Apr. 9, 2012

(65) Prior Publication Data

US 2013/0267181 A1 Oct. 10, 2013

(51) Int. Cl.
*H04B 1/38* (2006.01)
*H01Q 1/24* (2006.01)
*H04B 7/08* (2006.01)
*H04B 7/06* (2006.01)

(52) U.S. Cl.
CPC .............. *H01Q 1/243* (2013.01); *H04B 7/0602* (2013.01); *H04B 7/0808* (2013.01)

(58) Field of Classification Search
CPC ........................... H04B 7/0602; H04B 7/0808
USPC ........ 455/73, 63.1, 277.1, 136; 375/267, 347; 343/745
See application file for complete search history.

(56) References Cited

U.S. PATENT DOCUMENTS

| | | | | |
|---|---|---|---|---|
| 6,118,409 A * | 9/2000 | Pietsch et al. | ................. | 343/703 |
| 7,099,380 B1 | 8/2006 | Feng et al. | | |
| 7,106,271 B1 * | 9/2006 | Friday | ........................... | 343/853 |
| 2006/0018288 A1 * | 1/2006 | Luo et al. | ...................... | 370/334 |
| 2006/0025090 A1 * | 2/2006 | Shirakata et al. | ............. | 455/136 |
| 2007/0071149 A1 * | 3/2007 | Li et al. | .......................... | 375/347 |
| 2007/0184802 A1 * | 8/2007 | Carvalho et al. | ........... | 455/277.1 |
| 2008/0188186 A1 | 8/2008 | Hwang et al. | | |
| 2009/0146891 A1 * | 6/2009 | Chen | ............................. | 343/745 |
| 2010/0173590 A1 * | 7/2010 | Moorti et al. | ................. | 455/63.1 |
| 2010/0215111 A1 * | 8/2010 | Filipovic et al. | .............. | 375/267 |

FOREIGN PATENT DOCUMENTS

| EP | 1458120 A2 | 9/2004 |
|---|---|---|
| EP | 2040391 A2 | 3/2009 |

OTHER PUBLICATIONS

European Search Report dated Aug. 7, 2013 for Application No. 13162763.0-182.

* cited by examiner

*Primary Examiner* — Wesley Kim
*Assistant Examiner* — Raj Chakraborty
(74) *Attorney, Agent, or Firm* — Conley Rose, P.C.; J. Robert Brown, Jr.

(57) ABSTRACT

Embodiments of the disclosure provide systems and methods for improving user equipment performance by implementing antenna selection based on measurement of performance parameters of a plurality of antennas. In some embodiments, the antenna parameter measurements comprise radiated power. In other embodiments, the antenna parameter measurements comprise reflected power. In various embodiments, the antenna parameter measurements may be based on data from sensors that are operable to detect operational characteristics of the plurality of antennas based on the proximity of a portion of a user's body to the sensors. The antenna parameter measurements are then used to select one of the antennas within the plurality of antennas for transmitting and receiving data signals by a wireless communication device.

12 Claims, 5 Drawing Sheets

DYNAMIC ANTENNA SELECTION BASED ON USER HAND POSITION

BACKGROUND OF THE DISCLOSURE

1. Field of the Disclosure

The present disclosure is directed in general to communication systems and, more specifically, to systems and methods for dynamic selection of antennas in wireless devices based on the near field environmental effects, especially hand position of a user.

2. Description of the Related Art

With the development of new communication standards and services, new radio access technologies (RAT) have been developed to support multiple application and services in a single wireless device. Each RAT can use single or multiple antennas and also an antenna can be shared between multiple RATs and support multiple frequency bands. When two or more antennas are used for a single RAT, the device can operate in several modes including diversity, beam-forming and multiple input multiple output (MIMO).

The performance of an antenna in a wireless device is affected by its near field environment, for example nearby objects. This includes the user of the wireless device. When the wireless device is utilized in the proximity of the user, due to the dielectric loading effect of the human tissue, the performance of the antenna is degraded. In particular, when the user holds the device in such a way that the hand or the finger is masking the antenna, the performance is degraded significantly. To prevent this issue as much as possible and provide better coverage, it is desired to locate the antenna at the top or bottom edge of the device. Although with this placement, the problem of antenna masking by human hand is reduced, but there exists EMI issues due to the close proximity of the antenna to the audio circuits, which is a serious challenge in obtaining the required RF characteristics. Also, since the location of antennas is driven by mechanical requirements and customer desired device form factor, the multiple antennas in the device can be placed anywhere in the device based on these constraints. Therefore, it might not always be possible to locate the antenna in the optimum place in terms of radiation performance.

The effect of the user's head, hand, and other environmental parameters affecting antenna performance, depend on the scenario that the device is used, for example typing, phone call, etc. In addition, there might be new requirements imposed by FCC on handset makers on complying with SAR in user's hand. Also, in multi standard devices, multiple RATs may operate simultaneously, which can affect the performance of an antenna, whether it is used as a shared antenna between two or more RATs or utilized for one RAT.

To overcome the above issues, antenna systems are desired which use multiple antennas for a single RAT and there is a freedom on using the optimum antenna among the multiple ones for operation in a given use case scenario. For example plurality of antennas can be placed on the periphery of the circuit board to save space, provide diversity operation or be used in MIMO configuration for LTE and other new wireless standards. Multiple antennas can also be located in other places on the device or on the circuit board. The antennas can be dual or multiband antennas to support multiple RATs.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Figure 1:
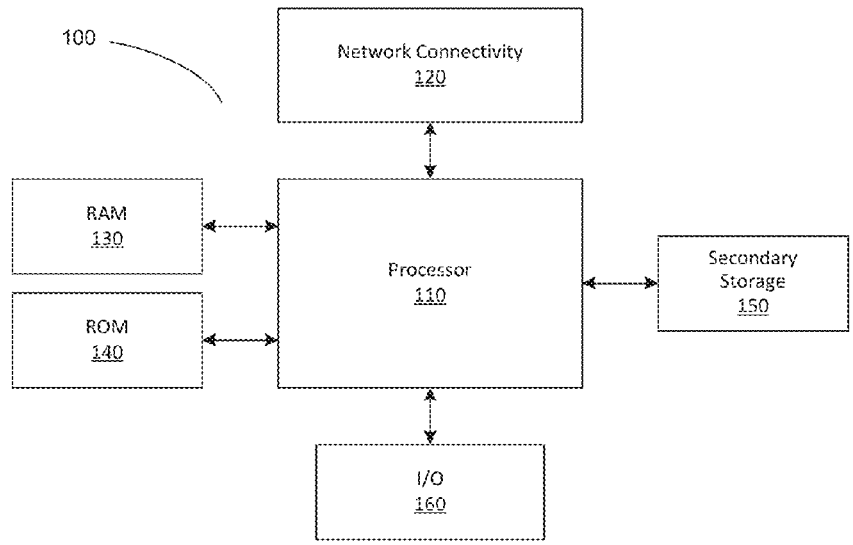
FIG. 1 depicts an exemplary system in which the present invention may be implemented.

Embodiments of the disclosure provide systems and methods for dynamically selecting the operating antenna among multiple antennas in a wireless device based on user's hand/head position relative to the antennas. Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flowchart form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "device",r "wireless device" or "user equipment device" may refer to portable devices such as mobile telephones, personal digital assistants, handheld computers, laptop computers, tablet computers, or similar devices, but may also refer to devices that are not transportable, such as desktop computers, set-top boxes, network appliances, or similar devices capable of wireless communication. Time interval and time period has been used interchangeably in this application.

As used herein, the terms "component," "system" and the like are intended to refer to a computer-related entity, either hardware, software, a combination of hardware and software, or software in execution. For example, a component may be, but is not limited to being, a processor, a process running on a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, Data Subscriber Line (DSL) modems, and wireless LAN (WLAN) access points. Examples of Internet or Intranet nodes include host computers identified by an Internet Protocol (IP) address, bridges and WLAN access points. Likewise, examples of nodes in cellular communication include base stations, relays, base station controllers, radio network controllers, home location registers, Gateway GPRS Support Nodes (GGSN), Serving GPRS Support Nodes (SGSN), Serving Gateways (S-GW), and Packet Data Network Gateways (PDN-GW).

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or conversely, to devices that have similar capabilities that are not generally transportable, such as desktop computers, set-top boxes, or sensors. Likewise, a server node, as used herein, refers to an information processing device (e.g., a host computer), or series of information processing devices, that perform information processing requests submitted by other nodes. As likewise used herein, a peer node may sometimes serve as client node, and at other times, a server node. In a peer-to-peer or overlay network, a node that actively routes data for other networked devices as well as itself may be referred to as a supernode.

An access node, as used herein, refers to a node that provides a client node access to a communication environment. Examples of access nodes include cellular network base stations and wireless broadband (e.g., WiFi, WiMAX, etc) access points, which provide corresponding cell and WLAN coverage areas. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices.

In general, a coverage area of less than two kilometers typically corresponds to a microcell, 200 meters or less for a picocell, and on the order of 10 meters for a femtocell. As likewise used herein, a client node communicating with an access node associated with a macrocell is referred to as a "macrocell client." Likewise, a client node communicating with an access node associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

FIG. 1 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity interfaces 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity interfaces 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity interfaces 120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, long term evolution (LTE) radio transceiver devices, worldwide interoperability for microwave access (WiMAX) devices, and/or other well-known interfaces for connecting to networks, including Personal Area Networks (PANs) such as Bluetooth. These network connectivity interfaces 120 may enable the processor 110 to communicate with the Internet or one or more telecommunications networks or other networks from which the processor 110 might receive information or to which the processor 110 might output information.

The network connectivity interfaces 120 may also be capable of transmitting or receiving data wirelessly in the form of electromagnetic waves, such as radio frequency signals or microwave frequency signals. Information transmitted or received by the network connectivity interfaces 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may likewise be used to store instructions and data that is read during execution of the instructions. The secondary storage 150 is typically comprised of one or more disk drives or tape drives and may be used for non-volatile storage of data or as an overflow data storage device if RAM 130 is not large enough to hold all working data. Secondary storage 150 may likewise be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper tape readers, printers, video monitors, or other well-known input/output devices.

Figure 2:
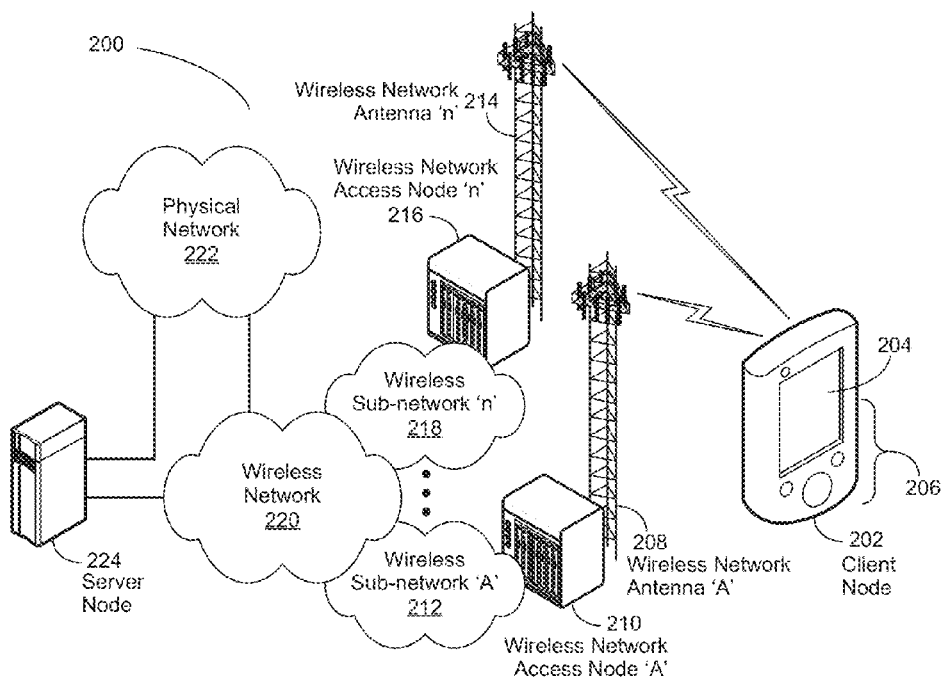
FIG. 2 shows a wireless-enabled communications environment including an embodiment of a client node.

FIG. 2 shows a wireless-enabled communications environment including an embodiment of a client node as implemented in an embodiment of the invention. Though illustrated as a mobile phone, the client node 202 may take various forms including a wireless handset, a pager, a smart phone, or a personal digital assistant (PDA). In various embodiments, the client node 202 may also comprise a portable computer, a tablet computer, a laptop computer, or any computing device operable to perform data communication operations. Many suitable devices combine some or all of these functions. In some embodiments, the client node 202 is not a general purpose computing device like a portable, laptop, or tablet computer, but rather is a special-purpose communications device such as a telecommunications device installed in a vehicle. The client node 202 may likewise be a device, include a device, or be included in a device that has similar capabilities but that is not transportable, such as a desktop computer, a set-top box, or a network node. In these and other embodiments, the client node 202 may support specialized activities such as gaming, inventory control, job control, task management functions, and so forth.

In various embodiments, the client node 202 includes a display 204. In these and other embodiments, the client node 202 may likewise include a touch-sensitive surface, a keyboard or other input keys 206 generally used for input by a user. The input keys 206 may likewise be a full or reduced alphanumeric keyboard such as QWERTY, Dvorak, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be inwardly depressed to provide further input function. The client node 202 may likewise present options for the user to select, controls for the user to actuate, and cursors or other indicators for the user to direct.

The client node 202 may further accept data entry from the user, including numbers to dial or various parameter values for configuring the operation of the client node 202. The client node 202 may further execute one or more software or firmware applications in response to user commands. These applications may configure the client node 202 to perform various customized functions in response to user interaction. Additionally, the client node 202 may be programmed or configured over-the-air (OTA), for example from a wireless network access node 'A' 210 through 'n' 216 (e.g., a base station), a server node 224 (e.g., a host computer), or a peer client node 202.

Among the various applications executable by the client node 202 are a web browser, which enables the display 204 to display a web page. The web page may be obtained from a server node 224 through a wireless connection with a wireless network 220. As used herein, a wireless network 220 broadly refers to any network using at least one wireless connection between two of its nodes. The various applications may likewise be obtained from a peer client node 202 or other system over a connection to the wireless network 220 or any other wirelessly-enabled communication network or system.

In various embodiments, the wireless network 220 comprises a plurality of wireless sub-networks (e.g., cells with corresponding coverage areas) 'A' 212 through 'n' 218. As used herein, the wireless sub-networks 'A' 212 through 'n' 218 may variously comprise a mobile wireless access network or a fixed wireless access network. In these and other embodiments, the client node 202 transmits and receives communication signals, which are respectively communicated to and from the wireless network nodes 'A' 210 through 'n' 216 by wireless network antennas 'A' 208 through 'n' 214 (e.g., cell towers). In turn, the communication signals are used by the wireless network access nodes 'A' 210 through 'n' 216 to establish a wireless communication session with the client node 202. As used herein, the network access nodes 'A' 210 through 'n' 216 broadly refer to any access node of a wireless network. As shown in FIG. 2, the wireless network access nodes 'A' 210 through 'n' 216 are respectively coupled to wireless sub-networks 'A' 212 through 'n' 218, which are in turn connected to the wireless network 220.

In various embodiments, the wireless network 220 is coupled to a physical network 222, such as the Internet. Via the wireless network 220 and the physical network 222, the client node 202 has access to information on various hosts, such as the server node 224. In these and other embodiments, the server node 224 may provide content that may be shown on the display 204 or used by the client node processor 110 for its operations. Alternatively, the client node 202 may access the wireless network 220 through a peer client node 202 acting as an intermediary, in a relay type or hop type of connection. As another alternative, the client node 202 may be tethered and obtain its data from a linked device that is connected to the wireless network 212. Skilled practitioners of the art will recognize that many such embodiments are possible and the foregoing is not intended to limit the spirit, scope, or intention of the disclosure.

Figure 3:
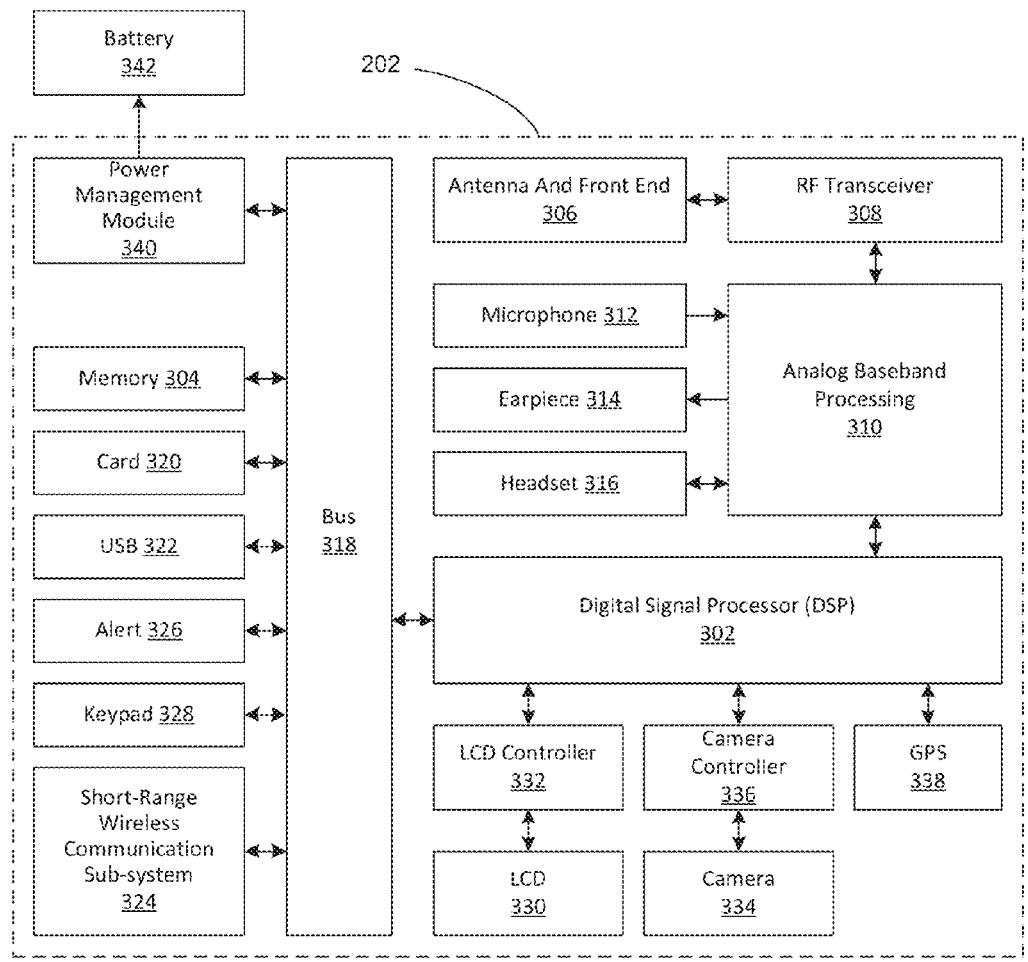
FIG. 3 is a simplified block diagram of an exemplary client node comprising a digital signal processor (DSP)

FIG. 3 depicts a block diagram of an exemplary client node as implemented with a digital signal processor (DSP) in accordance with an embodiment of the invention. While various components of a client node 202 are depicted, various embodiments of the client node 202 may include a subset of the listed components or additional components not listed. As shown in FIG. 3, the client node 202 includes a DSP 302 and a memory 304. As shown, the client node 202 may further include an antenna and front end unit 306, a radio frequency (RF) transceiver 308, an analog baseband processing unit 310, a microphone 312, an earpiece speaker 314, a headset port 316, a bus 318, such as a system bus or an input/output (I/O) interface bus, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338, and a power management module 340 operably coupled to a power storage unit, such as a battery 342. In various embodiments, the client node 202 may include another kind of display that does not provide a touch sensitive screen. In one embodiment, the DSP 302 communicates directly with the memory 304 without passing through the input/output interface 318.

In various embodiments, the DSP 302 or some other form of controller or central processing unit (CPU) operates to control the various components of the client node 202 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the client node 202 to send and receive information from a cellular network or some other available wireless communications network or from a peer client node 202. In an embodiment, the antenna and front end unit 106 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 306 may include antenna tuning or impedance matching components, RF power amplifiers, or low noise amplifiers.

In various embodiments, the RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 108, portions of the Antenna and Front End 306, and the analog base band processing unit 310 may be combined in one or more processing units and/or application specific integrated circuits (ASICs).

The analog baseband processing unit 310 may provide various analog processing of inputs and outputs, for example analog processing of inputs from the microphone 312 and the headset 316 and outputs to the earpiece 314 and the headset 316. To that end, the analog baseband processing unit 310 may have ports for connecting to the built-in microphone 312 and the earpiece speaker 314 that enable the client node 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the client node 202 and may also enable the client node 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the client node 202 to communicate wirelessly with other nearby client nodes and access nodes.

The input/output interface 318 may further connect the DSP 302 to the alert 326 that, when triggered, causes the client node 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the DSP 302 via the I/O interface 318 to provide one mechanism for the user to make selections, enter information, and otherwise provide input to the client node 202. The keyboard 328 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the client node 202 to take digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals or other navigational signals, thereby enabling the client node 202 to determine its position. Various other peripherals may also be included to provide additional functions, such as radio and television reception.

Figure 4:
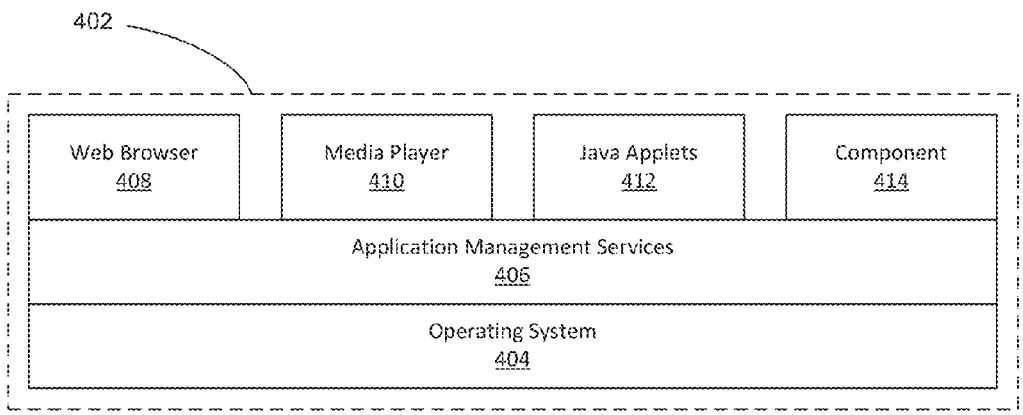
FIG. 4 is a simplified block diagram of a software environment that may be implemented by a DSP.

FIG. 4 illustrates a software environment 402 that may be implemented by a digital signal processor (DSP). In this embodiment, the DSP 302 shown in FIG. 3 executes an operating system 404, which provides a platform from which the rest of the software operates. The operating system 404 likewise provides the client node 202 hardware with standardized interfaces (e.g., drivers) that are accessible to application software. The operating system 404 likewise comprises application management services (AMS) 406 that transfer control between applications running on the client node 202. Also shown in FIG. 4 are a web browser application 408, a media player application 410, and Java applets 412. The web browser application 408 configures the client node 202 to operate as a web browser, allowing a user to enter information into forms and select links to retrieve and view web pages. The media player application 410 configures the client node 202 to retrieve and play audio or audiovisual media. The Java applets 412 configure the client node 202 to provide games, utilities, and other functionality. A component 414 may provide functionality described herein. In various embodiments, the client node 202, the wireless network nodes 'A' 210 through 'n' 216, and the server node 224 shown in FIG. 2 may likewise include a processing component that is capable of executing instructions related to the actions described above.

Embodiments of the disclosure provide systems and methods for dynamically selecting an operating antenna among multiple antennas in a device based on user's hand position or head position relative to the antennas. The same method can also be used when other nearby objects block an operating antenna among the multiple antennas or affect its performance. Other nearby objects can include active and passive electronic components in the device or connected to the device or other antennas in the device operating in other RAT or other frequency bands. For example the selected antenna is operating in one of the LTE bands, with the WLAN radio off. When the WLAN radio is turned on, the WLAN antenna may load the selected LTE antenna and degrade its performance. Using the methods described in this disclosure, the antenna that is less affected by the operation of the WLAN radio is selected. Another example is when the audio headset is connected to the device and the performance of the cellular antenna is degraded. The method can be used for any placement of the antennas, either external or internal to the device. It can also be used when the device is operating in diversity or MIMO configurations. For MIMO or other multi antenna transmission and reception technologies that multiple antennas can operate simultaneously for a single RAT, the methods and embodiments disclosed here can be applied to select the multiple antennas which are less affected by the environment and user presence and offer better performance in terms of radiation characteristics, including radiation efficiency, gain, transmitted power, received power, transmitted signal, received signal or signal to noise ratio (SNR) or signal to interference plus noise ratio (SINR) among other parameters, or the change of its input impedance is the least and thus has the maximum power transfer. In some embodiments, the systems and methods are based on monitoring of the transmitted and/or the received power (or SNR) at each antenna port and selecting the antenna which transmits or receives the maximum power or provides better SNR. In another embodiment, the systems and methods are based on monitoring the reflected power and selecting the antenna which has less reflected power at its port. As will be understood by those of skill in the art, the reflected power at an antenna port, is an indicator of the impedance of the port.

The power measurement can be performed in specific time periods and based on this measurement, a particular antenna can be selected from the plurality of antennas for operation in the next time period. The time period for measurement can be predetermined, for example it can be one transmission or reception time slot, multiple transmission or reception time slots or other predetermined periodic or aperiodic time intervals.

Figure 5:
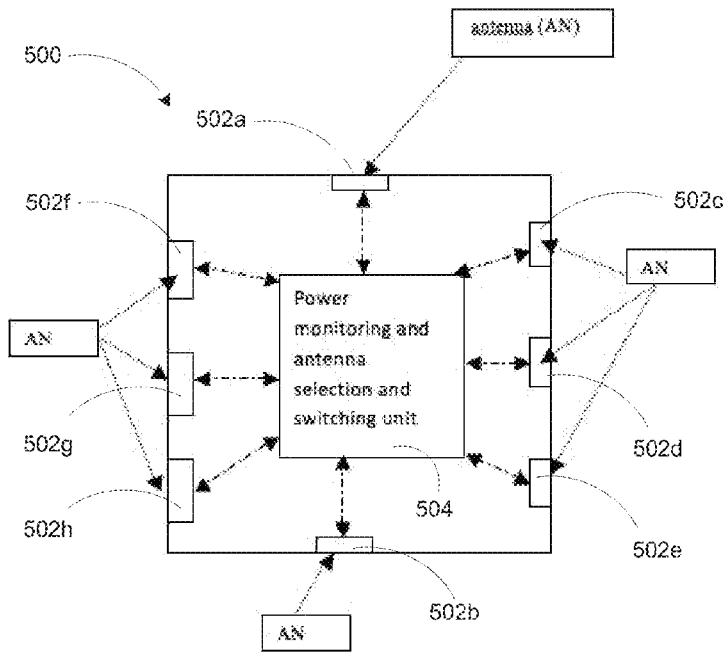
FIGS. 5-10 are flowcharts showing processing steps for implementing embodiments of the disclosure.

FIG. 5 is an illustration of a user equipment device 500 comprising a plurality of antennas. In this example embodiment, the user equipment 500 comprises antennas 502 and 502b on the upper and lower portions, respectively, and antennas 502c-e and 502f-h on the left and right portions, respectively. In this particular example, the antennas are placed on the periphery of the device. The location and the number of antennas in FIG. 5 are for illustration only. The number and locations can change without departing from the scope of the disclosure. The system also comprises a power monitoring and antenna selection and switching unit 504. The power monitoring and antenna selector and switching unit can be a single unit or it can be two different units; a) power monitoring and antenna selector; and b) antenna switching. Alternatively, the power monitoring can be replaced by an impedance monitoring unit to monitor the input impedance of the antenna instead of power. In this disclosure, when referred to power monitoring, it includes impedance monitoring as well. The transmitted/received power, the total radiated power, SNR and SNR are also denoted by power parameter in this disclosure and reflected power and impedance change denoted by reflected power parameter. When the user equipment device 500 is in operating mode, the power monitoring and antenna selector unit 504 selects one or more of the antennas for transmission or reception of the signals. Then, by monitoring the transmitted, received, or reflected power (which is an indication of change in impedance level) at specific time intervals, through the power monitoring and antenna selection unit 504, the antenna which is least affected by the user's presence is selected for operation in the next time interval. Operation includes transmission or reception.

In one embodiment, first the transmitted, reflected, or received powers at all antenna ports are measured and the one with the best performance is selected as the initial operating antenna. If the transmitted or received power monitoring and measurement is used, the best performing antenna among the multiple antennas will be the one with the most transmitted or received power. For reflected power or when the input impedance is measured, the antenna with less reflected power or less change in impedance level has the best performance. In this embodiment the transmitted, received or reflected power of all the antennas are monitored simultaneously and the one with maximum transmitted or received power or minimum reflected power at one of the respective antenna ports, is selected for transmission or reception for the next operating period or time interval.

In another embodiment, the transmitted, received, or reflected power at the antenna ports are initially measured in ideal environment conditions (for example in an anechoic chamber) while all antennas are transmitting or receiving, and tabulated in the memory of the device. In this way, if the ports are not isolated ideally, the effect of loading of other antennas on each one is also considered. When the user equipment device 500 is in operating mode, the reflected/transmitted/ received powers (which are indicative of environment loading effects) at the respective antenna ports are monitored or measured and compared with the initial values. The antenna with least difference is selected for transmission or reception in the next time period. The transmitted, received or reflected signal at the selected antenna port is then monitored at specific time intervals or continuously and if there is a change in the power, the antenna selection process as described above is repeated.

Figure 6:
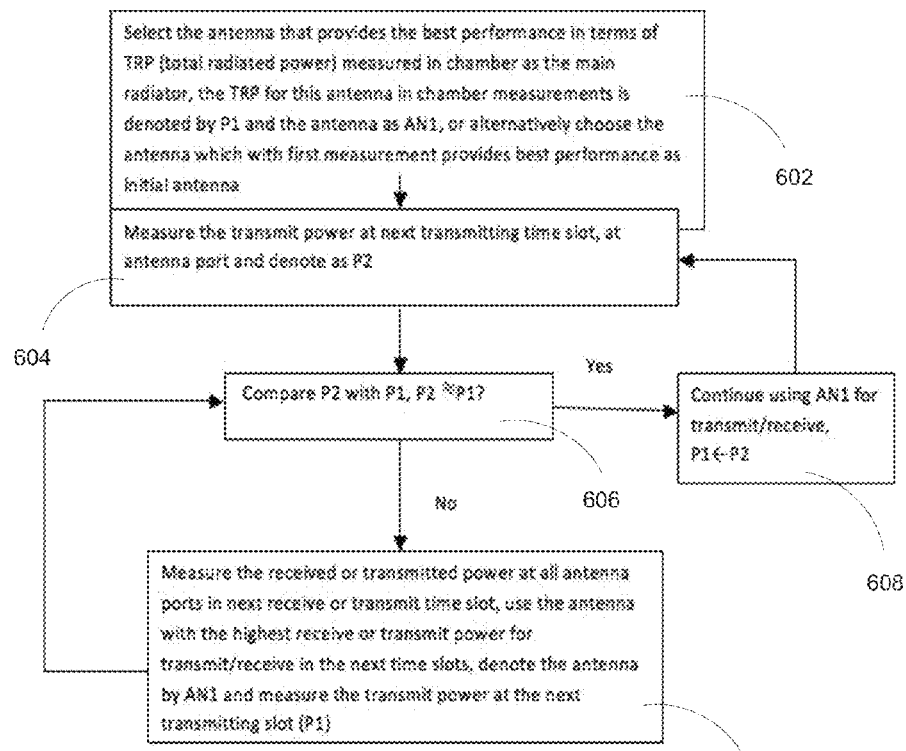

FIG. 6 is a flowchart representation of processing steps for implementing an embodiment of the disclosure. In step 602, the antenna that has the best performance, in terms of total radiated power (TRP), as measured in an anechoic chamber, is used as the initial operating antenna during a first operating time period. The transmitted/received/reflected power for this antenna is measured initially, before the first operating time period and denoted as P1 and the initial antenna is denoted as AN1. Alternatively, the transmitted, received or reflected power at all antenna ports are measured initially before the first operating time period and the one with best performance is chosen as the initial antenna AN1 and its transmitted, received or reflected power as P1. In step 604, the transmitted, received or reflected power at the antenna port AN1 at the end of the first time period is measured by the power monitoring and antenna selection unit 504 and is designated as P2. In step 606, a comparison test is conducted to compare P2 for the current time period with P1 for the previous time period. If the transmitted or received power is monitored and measured and the result of the comparison test conducted in step 606 indicates that the value of P2 is greater than or substantially the same as P1 processing proceeds to step 608, where the value of P1 is reset to the value of P2. For the case when reflected power is measured, if the value of P2 is less than or substantially the same as P1, processing proceeds to step 608, where the value of P1 is reset to the value of P2. The current AN1 is used and processing returns to step 604. If, however, the result of the test conducted in step 606 indicates that the value of P2 is less than the value of P1 for transmitted or received power measurement, or the value of P2 is greater than P1 if reflected power measurement is performed, processing proceeds to step 610 where, in the next time period, the power monitoring and antenna selection unit 504 measures the transmitted, received or reflected power for all antennas and in the case where transmitted or received power is measured selects the antenna with the highest transmitted or received power or in the case where reflected power is measured, selects the antenna with the lowest reflected power. The selected antenna is denoted as AN1 an the measured power is denoted as P1 for testing in the next time period. Processing then returns to step 606.

Figure 7:
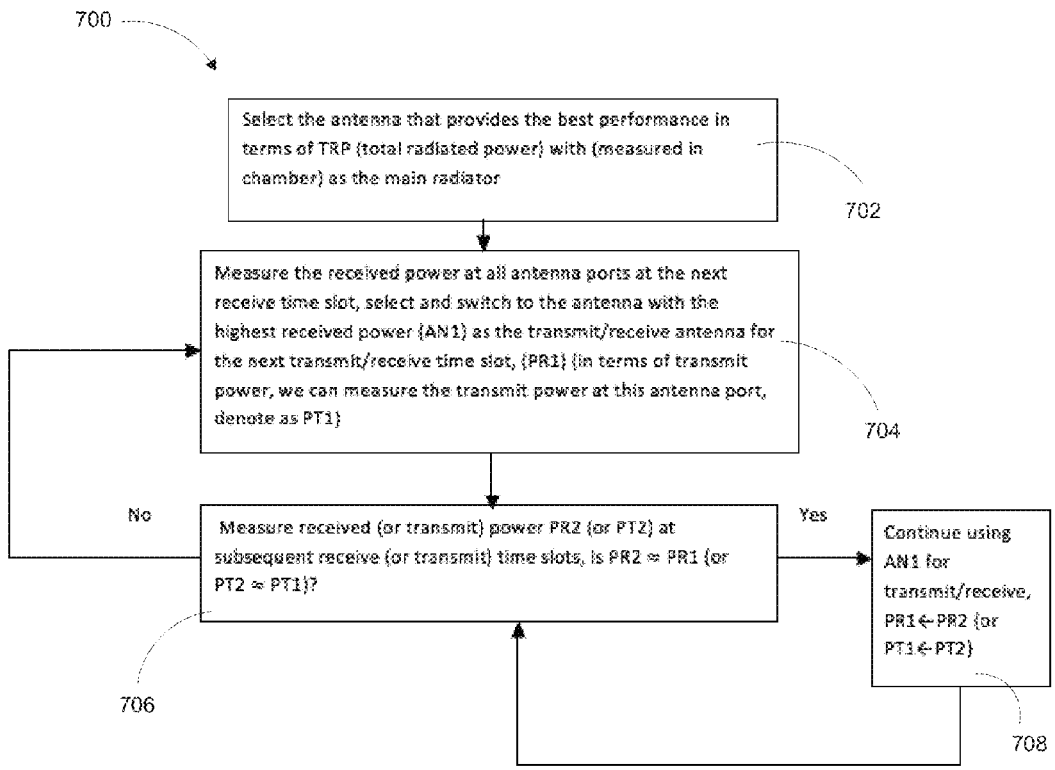

FIG. 7 is a flowchart representation of processing steps for implementing another embodiment of the disclosure. In step 702, the antenna that has the best performance, in terms of total radiated power (TRP), as measured in an anechoic chamber, is used as the initial operating antenna AN1 during a first operating time period. In step 704, the power monitoring and antenna selection unit 504 is used to obtain the actual power measurements of all antennas at the end of the first operating time period and to select the antenna having the highest received power or transmit power for use as the antenna AN1 in the next time slot. The received or transmitted power at this step is denoted by P1. If the reflected power is used as a measure for selecting the antenna, the reflected power at all antenna ports is measured at the end of the first operating time interval and the one with the lowest reflected power is selected as the operating antenna AN1 for the next transmit or receive time interval and its reflected power is denoted as P1. At the end of the next time period, the transmitted, received or reflected power is measured as in step 706 and the measured power is denoted by P2. A comparison test is conducted to compare P2 for the current time period with P1 for the previous time period. If the result of the comparison test conducted in step 706 for the transmitted or received power indicates that the value of P2 is greater than or substantially the same as P1, or in the case that the reflected power measurement is performed, if the comparison test indicates that the value of P2 is less than or substantially the same as the value of P1, processing proceeds to step 708, where the value of P1 is reset to the value of P2. The current AN1 is used and processing returns to step 706. If, however, the result of the test conducted in step 706 indicates that the value of P2 is less than the value of P1, processing proceeds to step 704 where, the power monitoring and antenna selection unit 504 measures the transmitted, received or reflected power for all antennas and selects the antenna with the highest transmit or received power or lower reflected power for operation in the next time period and that antenna is denoted as AN1 an the measured power is denoted as P1 for testing at the end of the next time period. Processing then returns to step 706.

Figure 8:
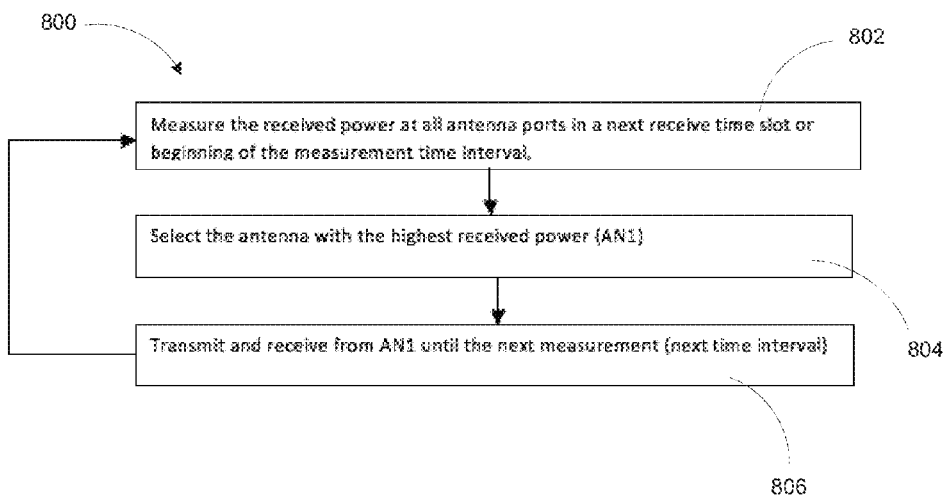

FIG. 8 is a flowchart illustration of another embodiment of the disclosure. This flowchart illustrates an embodiment for continuous updating of a preferred antenna AN1 after the initial AN1 has been selected. In step 802, the power monitoring and antenna selection unit 504 is used to obtain actual receive power measurements in the current time period for all of the antennas. In step 804, the antenna with the highest receive power is selected and denoted as AN1. In step 806, AN1 is used for both transmitting and receiving until the next time interval, at which time processing returns to step 802.

Figure 9:
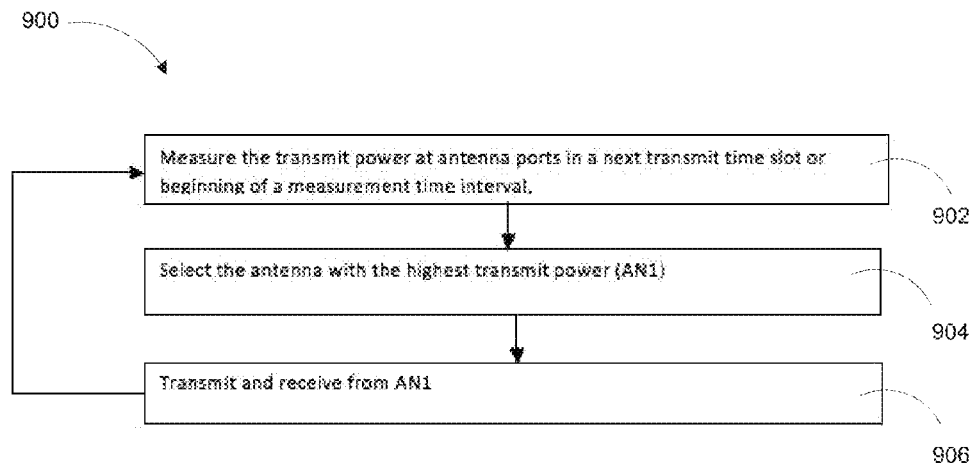

FIG. 9 is a flowchart illustration of yet another embodiment of the disclosure. This flowchart also illustrates an embodiment for continuous updating of a preferred antenna AN1 after the initial AN1 has been selected. In step 902, the power monitoring and antenna selection unit 504 is used to obtain actual transmit power measurements in the current time period for all of the antennas. In step 904, the antenna with the highest transmit power is selected and denoted as AN1. In step 906, AN1 is used for both transmitting and receiving until the next time interval, at which time processing returns to step 902.

Figure 10:
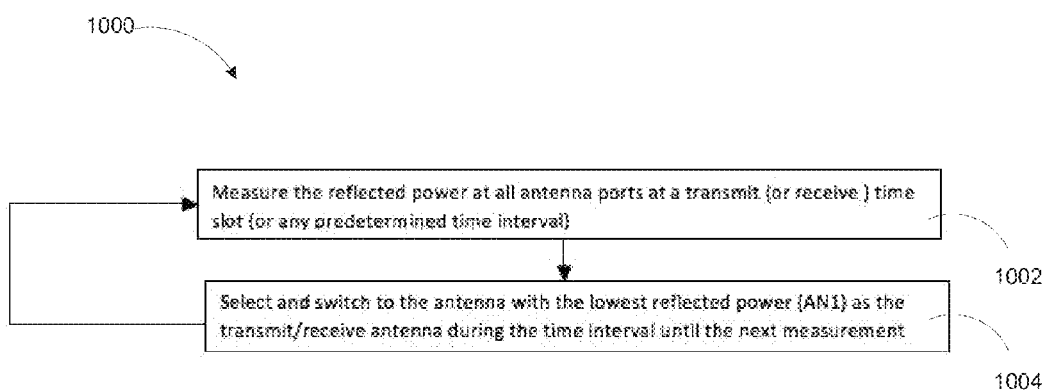

FIG. 10 is a flowchart illustration of yet another embodiment of the disclosure. This flowchart also illustrates an embodiment for continuous updating of a preferred antenna AN1 after the initial AN1 has been selected. In step 1002, the power monitoring and antenna selection unit 504 is used to obtain actual reflected power measurements in the current time period for all of the antennas. In step 1004, the antenna with the lowest reflected power is selected and denoted as AN1. In step 1006, AN1 is used for both transmitting and receiving until the beginning of next time interval, at which time processing returns to step 1002.

As will be understood by those of skill in the art, most users have a habit of repeatably holding the user equipment device 500 in a particular configuration. Therefore, it is possible for the power monitoring and antenna selection unit 504 to record the antennas which are most often selected for operation in prior usage scenarios and to use that information for performing its search for the best performing antenna to increase efficiency. In one embodiment, if the transmitted/received power at the preferred antenna is dropped, the power monitoring and measurement unit only measures the transmitted/ received power at the antenna ports that have been recorded as the operating antenna in prior usage, as opposed to measuring the power at all antenna ports. In this way, the complexity of measurement and antenna selection is reduced, since only a limited number of antennas among all the antennas are being considered by the power monitoring and antenna selection unit. The same approach can be taken when the reflected wave is considered as a measure of performance degradation of the operating antenna.

Alternatively a sensing unit can be used which uses sensors to sense the user's hand, head, or finger positions or other objects in the proximity of the antennas and send that information to the power monitoring and antenna selection unit 504. The power monitoring and antenna selection unit 504 then selects the antenna(s) that are not masked by the user's hand or other nearby objects for operation.

In one embodiment, after sensing a change in sensor states, the antenna selection process according to the above is performed. The loading of antennas in different use case scenarios are different. For example, when the user is using the device for e-mail, phone call, connecting headphone or other scenarios, the impact on the antennas would be different due to different loading effects on the antenna input impedance. For example in e-mail, the position of the hand of the user has the most effect on the antennas' performances. The closer the fingers are to an antenna, the mismatch or loading on that antenna is more and its performance is degraded more than other antennas of the device. These use case scenarios along with the sensor outputs for each case can be tabulated in the device memory to determine the use case scenario during operation of the device. This can be done initially or can be performed when the device is in use by a particular user. Therefore, for example using the touch sensor in the device, it is possible to detect whether the user is typing, and using proximity sensors and the change in antenna input power state (reflected/transmitted/received) determine which antenna is affected more by this operation. The measured power for each antenna can also be saved in the memory of the device. All these information either tabulated in the device memory or obtained in real time can be used by the power monitoring and antenna selection unit 504 to select the antenna which has the best performance. Another example is when the device is used in a phone call. In this situation, both the proximity of an antenna to the head and hand will affect its performance. Using for example touch sensor, accelerometer, proximity sensors, audio quality or other available sensors, the device can detect the phone call usage scenario as well as the effect on each antenna, and use the antenna with best performance for operation.

The habit of the user in holding the device for each use case can also be determined and tabulated in the device memory, based on sensor outputs and the power state detection for each antenna. For example, the user might hold the device when typing in a certain way, with a few fingers degrading the performance of one antenna completely and affecting other antennas performances with different degrees. In this case, the sensors have a certain output and the power state (reflected/transmitted or received) can have different values than its nominal value for each antenna. The sensor information along with the selected antenna for this case is stored in the device memory. In other instances, when the sensors detect this use case, the antenna will be selected automatically and there is no need to track the power states of the antennas.

In some embodiments, the use of power measurement and sensors can be combined. For example sensors can be used to sense the usage scenario. For each usage scenario, the initial antenna and the set of best performing antennas are available in the memory of the device. When a usage scenario and the initial antenna is selected using sensors, power measurement is performed as discussed previously on the selected antennas, or when power measurements on the initial (primary) antenna show degradation in performance, switch to the best available antenna using the embodiments for antenna selection explained previously in this disclosure and FIGS. 6-10.

The above method of using sensors, use case scenario and recording the habit of the user for selecting the best performing antenna for transmit/receive, can also be used when the device is shared between multiple users. In this case, based on each user's login information, the device keeps a record of each usage scenario based on the measured power at antenna ports and sensor outputs. When the device detects that a certain user is utilizing the device, it uses the recorded and saved values for that particular user to select the best performing antenna for the detected usage scenario.

Although the described exemplary embodiments disclosed herein are described with reference to estimating the impedance of antennas in devices, the present disclosure is not necessarily limited to the example embodiments which illustrate inventive aspects of the present invention that are applicable to a wide variety of authentication algorithms. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A wireless device, comprising:
a plurality of antennas;
processing logic operable to:
measure a predetermined power parameter of said plurality of antennas;
select a first antenna, within said plurality of antennas, having a highest first value for said predetermined power parameter;
use said first antenna for signal transmissions and reception during a first time interval;
continue using said first antenna for signal transmissions and reception at the beginning of a second time interval Immediately following the first time interval;
measure a second value of said predetermined power parameter for said first antenna during the second time interval;
continue using said first antenna for signal transmission and reception during the second time interval if said second value of said predetermined power parameter is equal to or higher than said first value; and
measure the predetermined power parameter of said plurality of antennas during the second time interval to select the antenna, within said plurality, having the highest second value of said predetermined power parameter for signal transmissions and reception in the second time interval if said second value of said predetermined power parameter for the first antenna is less than said first value of the predetermined power parameter for the first antenna.

2. The wireless device of claim 1, wherein said predetermined power parameter comprises total radiated power.

3. The wireless device of claim 2, wherein said total radiated power is measured in an anechoic chamber.

4. The wireless device of claim 1, wherein said predetermined parameter comprises transmitted power.

5. The wireless device of claim 1, wherein said predetermined parameter comprises received power.

6. A wireless device, comprising:
   a plurality of antennas;
   processing logic operable to:
   measure a reflected power parameter of said plurality of antennas;
   select a first antenna, within said plurality of antennas, having a lowest first value for said reflected power parameter;
   use said first antenna for signal transmissions and reception during a first time interval;
   continue using said first antenna for signal transmissions and reception at the beginning of a second time interval Immediately following the first time interval;
   measure a second value of said reflected power parameter for said first antenna during the second time interval;
   continue using said first antenna for signal transmission and reception during the second time interval if said second value of said reflected power parameter is equal to or lower than said first value; and
   measure the reflected power parameter of said plurality of antennas during the second time interval to select the antenna, within said plurality, having the lowest second value of said reflected power parameter for signal transmissions and reception in the second time interval if said second value of said reflected power parameter for the first antenna is greater than said first value of the reflected power parameter for the first antenna.

7. A method of processing information in a user equipment device, the method comprising:
   measuring a predetermined power parameter of a plurality of antennas;
   selecting a first antenna, within said plurality of antennas, having a highest first value for said predetermined power parameter;
   using said first antenna for signal transmissions and reception during a first time interval;
   continuing to use said first antenna for signal transmissions and reception at the beginning of a second time interval immediately following the first time interval;
   measuring a second value of said predetermined power parameter for said first antenna during the second time interval;
   continuing to use said first antenna for signal transmission and reception for said user equipment device during the second time interval if said second value of said predetermined parameter is equal to or higher than said first value; and
   measuring the predetermined power parameter of said plurality of antennas during the second time interval to select the antenna, within said plurality, having the highest second value of said predetermined parameter for signal transmissions in the second time interval if said second value of said predetermined parameter for the first antenna is less than said first value of the predetermined power parameter for the first antenna.

8. The method of claim 7, wherein said predetermined parameter comprises a total radiated power.

9. The method of claim 8, wherein said total radiated power is measured in an anechoic chamber.

10. The method of claim 7, wherein said predetermined parameter comprises transmitted power.

11. The method of claim 7, wherein said predetermined parameter comprises received power.

12. A method of processing data in a wireless device, the method comprising:
   measuring a reflected power parameter of a plurality of antennas;
   selecting a first antenna, within said plurality of antennas, having a lowest first value for said reflected power parameter;
   using said first antenna for signal transmissions and reception during a first time interval;
   continuing to use said first antenna for signal transmissions and reception at the beginning of a second time interval immediately following the first time interval;
   measuring a second value of said reflected power parameter for said first antenna during the second time interval;
   continuing to use said first antenna for signal transmission and reception during the second time interval if said second value of said reflected power parameter is equal to or lower than said first value; and
   measuring the reflected power parameter of said plurality of antennas during the second time interval to select the antenna, within said plurality, having the lowest second value of said reflected power parameter for signal transmissions in the second time interval if said second value of said reflected power parameter of the first antenna is greater than said first value of the reflected power parameter for the first antenna.

* * * * *